UNITED STATES PATENT OFFICE.

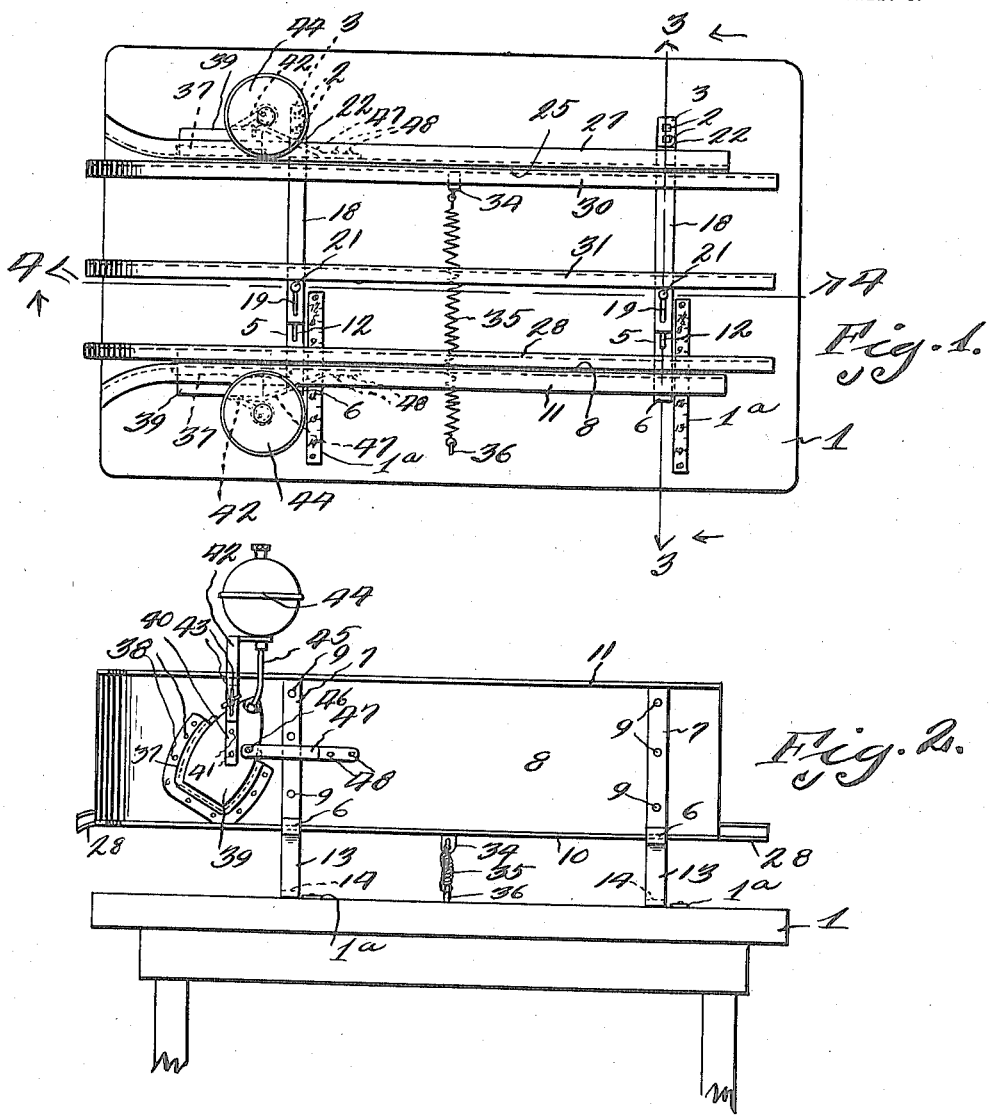

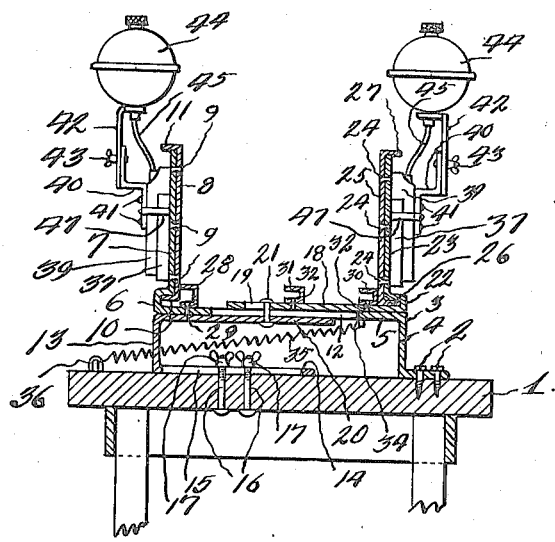
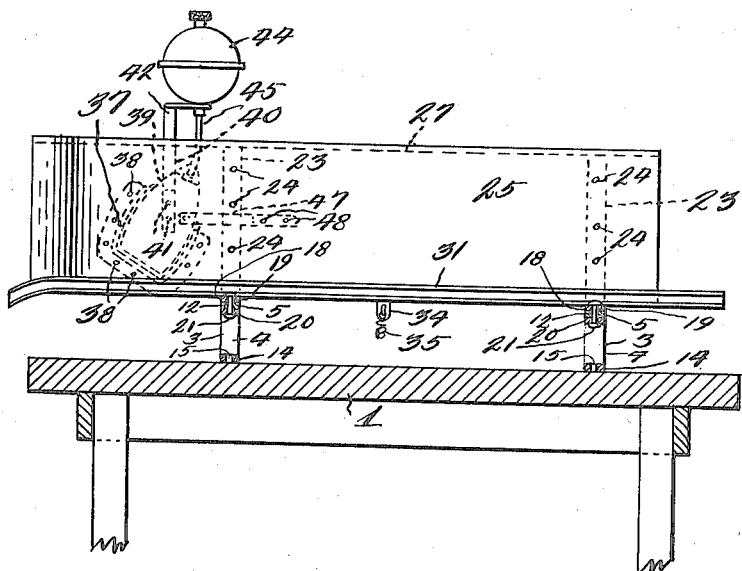

RICHARD SEJNOHA, OF WOLSEY, SOUTH DAKOTA.

MACHINE FOR SEALING BREAD-WRAPPERS AND THE LIKE.

1,269,866. Specification of Letters Patent. Patented June 18, 1918.

Application filed December 29, 1916. Serial No. 139,678.

*To all whom it may concern:*

Be it known that I, RICHARD SEJNOHA, a citizen of the United States, residing at Wolsey, in the county of Beadle, State of South Dakota, have invented a new and useful Machine for Sealing Bread-Wrappers and the like; and I do hereby declare the following to be a full, clear, and exact description of the invention, such as will enable others skilled in the art to which it appertains to make and use the same.

This invention relates to a new and useful machine for sealing bread and like wrappers, and one of the objects of the invention is to provide a simple, improved and practical machine of this kind provided with means for holding loaves of bread in position, whereby their wrappers may be sealed.

A further object of the invention is to provide means comprising a pair of opposing members, between which the loaves of bread, one at a time, are disposed, in combination with means carried by said members for imparting heat through the members, in order to soften the adhesive material, and thereby cause the sealing of the folded ends of the wrapper.

A further object of the invention is the provision of means for so mounting said members as to permit their adjustment toward and from each other, thereby allowing the wrappers of loaves of bread of different sizes to be sealed.

In practical fields, the details of construction may necessitate alterations falling within the scope of what is claimed.

The invention comprises further features and combination of parts, as hereinafter set forth, shown in the drawings and claimed.

In the drawings:—

Figure 1 is a plan view of the improved sealing machine constructed in accordance with the invention.

Fig. 2 is a view in side elevation.

Fig. 3 is a transverse sectional view on line 3—3 of Fig. 1.

Fig. 4 is a longitudinal sectional view on line 4—4 of Fig. 1.

Referring more especially to the drawings, 1 designates a suitable table or other support, to which, by means of the screws 2, plates 3 are secured. These plates have the vertical parts 4, which merge into the horizontal parts 5, and terminate in the rectangular loops 6, beyond which the vertical portions 7 are formed. A plate 8 is secured by rivets or the like 9 to said vertical portions 7, and the lower portion of the plate 8 is provided with a longitudinal flange 10, which engages the loops 6 of the straps 3. The upper portion of the plate 8 is provided with a longitudinal flange 11 which overlies the upper extremities of the vertical portions 7. The horizontal portions 5 of said straps or plates 3 have elongated slots 12. Straps or plates 13 (which are U-shaped in edge view) are provided. The lower portions 14 of said straps 13 have elongated slots 15, and extending through the bed plate of the table or other support 1 are bolts 16, which also extend through said slots 15 and have winged nuts 17 threaded thereon, whereby said straps 13 may be adjusted to different positions. Straps 18 are mounted upon the horizontal portions 5 of the straps or plates 3. The horizontal parts of said plates 18 have slots 19, through which and through the slots 12 of said horizontal portions 5, and through the horizontal portions 20 of said straps 13, the pins 21 extend. These pins are of such construction as to permit the straps 18 to be adjusted. The outer end portions of the horizontal parts of said straps 18 are bent to form the loops 22, beyond which the portions 23 upwardly extend. Secured to the vertical portions 23 by means of the rivets 24 is a plate 25, which has a flange 26 engaging the loops 22 of said straps 18, and a flange 27 at its upper portion to overlie the extremities of the vertical portions 23. It is to be noted that said plates 8 and 25 oppose each other, so that the loaves of bread with their wrappers may be placed therebetween, so that the ends of the bread and the folded ends of the wrapper may engage said plates. The straps 3 are connected by means of the channel bars 28, which are riveted at 29 to said straps. Channel bars 30 and 31 are secured by means of the rivets 32 to the horizontal portions of straps 18, thereby insuring rigidity between the straps. Extending downwardly from and secured to the channel bar 30, in any suitable manner, is a lug or angle plate 34, to which a spring 35 is connected. This spring is in turn connected to an eye 36 of the bed plate of the table 1, thereby putting the straps 18 and the plate 25 under tension. In other words, by means of the spring the plate 25 is held yieldably in position against one end of each loaf of bread. It is to be noted, however, that the forward ends of said plates 8 and 25, are flared outwardly, so that the loaves of bread with their wrappers, (the ends of which having been previously folded) may be easily inserted between the opposing plates. On the outer face of each plate 8 and 25, a suitable U-shaped holder 37 is secured by the rivets or the like 38, to receive a suitable oil burning iron 39. A bracket 40 is secured by rivets or the like 41 to each iron. A second bracket 42 is adjustably secured to each bracket 40 by means of a slot and bolt connection 43, whereby the bracket 42 may be adjusted vertically. The bracket 42 carries a suitable oil tank or receptacle 44 having a conduit connection 45 with the iron, in order to supply suitable fuel to the iron. Secured by rivets 46 to each iron, is a strap 47, which in turn is secured by rivets 48 to each plate. It is to be noted that when the irons are lighted, heat is transmitted to the plates 8 and 25, so that when the loaves of bread with the folded ends of the wrappers in contact with the adjacent faces of said plates, heat from the plates will soften the adhesive material of the folded ends of the wrappers sufficiently to cause the parts to adhere.

By loosening the winged nuts 17, it is to be seen that the straps 13 may be adjusted, so that the opposing plates 8 and 25 will permit of the reception therebetween of loaves of bread of substantially the same length. However, the loaves of bread vary slightly in length, hence the plate 25 may be adjusted yieldably to accommodate the variations in the bread, owing to the slots and the pins 21.

The invention having been set forth, what is claimed as new and useful, is:—

1. In a machine for sealing bread wrappers, the combination of a bed plate and a heated plate, of brackets on the bed plate to support the heated plate in a raised stationary position above the bed plate, said brackets having slots, a second heated plate having straps engaging upon said brackets, guide bars connecting said straps, a guide bar connecting said brackets, and U-shaped members under said brackets and having sliding connections with said straps through the slots of the brackets.

2. In a machine for sealing wrappers, the combination of a bed plate and a heated plate, of brackets on the bed plate to support the heated plate in a raised stationary position above the bed plate, said brackets having slots, a second heated plate having straps engaging upon said brackets, guide bars connecting said straps, a guide bar connecting said brackets, U-shaped members under said brackets and having adjustable connections with the bed plate and provided with sliding connections with said straps, a spring connecting said bed plate and one of the guide bars of said straps, and means for heating the opposing plates.

3. In a machine for sealing wrappers, a bed plate, brackets secured on the bed plate near one side and having portions arching across the bed plate toward the opposite sides thereof, said arching portions terminating in upwardly extending parts provided with a heating element, said arching portions having slots, straps on said arching portions provided with slots, longitudinal bars connecting said straps, a heating element carried by the straps, U-shaped brackets on the bed plate under the arching portions of the first brackets, means for adjustably securing the U-shaped brackets to the plate, whereby they may be adjusted toward the first bracket, headed pins carried by the upper parts of the U-shaped brackets, and extending through the slots of the arching portions and said straps, whereby the straps are guided in their yieldable movements, and yieldable springs connected to one of the bars, and in turn to the bed plate, whereby the last named heating element may be held yieldably against the wrapper.

4. In a machine for sealing wrappers, the combination with a bed plate, of stationary and movable opposing brackets mounted upon the bed plate, the movable brackets being U-shaped and adjustably connected to the bed plate, the stationary bracket arching over and being adjustably connected to the upper parts of said U-shaped brackets, the arching portions terminating in upwardly extending parts provided with a heating element, straps engaging the arching portions and being adjustably connected thereto, said straps having upstanding parts provided with a heating element, longitudinal members connecting said straps, and yieldable means connected to one of the longitudinal members, and in turn to said bed plate, whereby the last named heating element may be held yieldably against the wrapper.

In testimony whereof I have signed my name to this specification in the presence of two subscribing witnesses.

RICHARD SEJNOHA.

Witnesses:
  W. W. Howes,
  Geo. W. Lumbard.